(12) United States Patent
Pomerantz et al.

(10) Patent No.: US 9,705,970 B2
(45) Date of Patent: Jul. 11, 2017

(54) SYSTEM OF GEOGRAPHIC MIGRATION OF WORKLOADS BETWEEN PRIVATE AND PUBLIC CLOUDS

(71) Applicant: International Business Machines Corporation, Armonk, NY (US)

(72) Inventors: Ori Pomerantz, Pflugerville, TX (US); Benjamin Hicks Briggs, Austin, TX (US); Louis Thomas Fuka, Austin, TX (US); Orcun Atakan, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 14/447,758

(22) Filed: Jul. 31, 2014

(65) Prior Publication Data
US 2016/0036893 A1     Feb. 4, 2016

(51) Int. Cl.
*H04L 29/08* (2006.01)
*H04L 12/911* (2013.01)

(52) U.S. Cl.
CPC .............. *H04L 67/10* (2013.01); *H04L 47/70* (2013.01); *H04L 67/1021* (2013.01)

(58) Field of Classification Search
CPC .... H04L 47/12; H04L 47/125; H04L 12/6418
USPC ........................................................ 709/201
See application file for complete search history.

(56) References Cited

U.S. PATENT DOCUMENTS

| | | | |
|---|---|---|---|
| 8,176,490 | B1 | 5/2012 | Jackson |
| 2011/0270968 | A1 | 11/2011 | Salsburg et al. |
| 2012/0131176 | A1 | 5/2012 | Ferris et al. |
| 2012/0204187 | A1 | 8/2012 | Breiter et al. |
| 2012/0233222 | A1* | 9/2012 | Roesch ............... H04L 63/1408 707/812 |
| 2012/0304179 | A1 | 11/2012 | Devarakonda |
| 2013/0042123 | A1* | 2/2013 | Smith ................... G06F 9/5094 713/300 |
| 2013/0346572 | A1* | 12/2013 | Jain ....................... G06F 9/5088 709/223 |
| 2014/0115139 | A1* | 4/2014 | Bradley ............ G06F 17/30289 709/223 |
| 2014/0157363 | A1* | 6/2014 | Banerjee ............. G06F 9/45558 726/2 |

* cited by examiner

*Primary Examiner* — Vivek Srivastava
*Assistant Examiner* — Sibte Bukhari
(74) *Attorney, Agent, or Firm* — VanLeeuwen & VanLeeuwen; Richard A. Wilhelm

(57) ABSTRACT

A database contains available cloud environments to which a virtual image workload may be deployed. The database includes ratings for each available cloud option, such as cost, distance, reliability, which workloads that environment may handle. A table of attributes and weights is used to create a rating of the requested deployment. This rating determines where the image is deployed. The invention discloses techniques for gathering additional information from the user about the virtual image workload to be deployed. A mapping algorithm applies the attributes and weights to the gathered information to create a rating for the deployment. An algorithm is then used to determine to which available cloud environment the workload will be deployed.

10 Claims, 6 Drawing Sheets

SYSTEM OF GEOGRAPHIC MIGRATION OF WORKLOADS BETWEEN PRIVATE AND PUBLIC CLOUDS

CROSS-REFERENCE TO RELATED APPLICATIONS

This application is a continuation of the parent application Ser. No. 14/097,068 filed on Dec. 4, 2013. The status of this parent application is pending. The contents of the parent application are incorporated by reference herein.

FIELD OF THE INVENTION

This invention relates to a system for more efficient processing of computer system workloads and in particular to a system for migrating computing system workloads between private and public clouds in order to facilitate more efficient use of computing resources and more efficient processing of computing workloads.

BACKGROUND OF THE INVENTION

A computer storage or memory comprises components used to retain digital data. The computer memory is a core component of computer systems. Computer systems generally incorporate a storage hierarchy. The traditional divisions of computer storage are primary, secondary, tertiary and off-line storage. Primary storage (or main memory) is often referred to as the memory. The primary memory is the only memory type that is directly accessible to the central processing unit (CPU). The CPU continuously reads instructions stored there and executes them as required. Any data actively operated on is also stored there in uniform manner. Secondary storage (also known as external memory or auxiliary storage), differs from primary storage in that it is not directly accessible by the CPU. The computer usually uses its input/output channels to access secondary storage and transfers the desired data using intermediate area in primary storage. Tertiary storage or tertiary memory provides a third level of storage. Tertiary storage involves a robotic device which mounts, inserts and dismounts removable mass storage media into a storage device according to the system's demands. This data is often copied to secondary storage before use. It is primarily used for archiving rarely accessed information since it is much slower than secondary storage. Tertiary storage is primarily useful for extraordinarily large data stores, accessed without human operators. Off-line storage is a computer data storage on a medium or a device that is not under the control of a processing unit. The medium is recorded, usually in a secondary or tertiary storage device, and then physically removed or disconnected. It must be inserted or connected by a human operator before a computer can access it again. Unlike tertiary storage, it cannot be accessed without human interaction. Off-line storage is used to transfer information, since the detached medium can be easily physically transported.

As technology has progressed, another form of computer storage is increasing in popularity and usage. This form of storage is referred to as "cloud storage". Cloud storage is based on cloud computing. Cloud computing describes a variety of computing concepts that involve a large number of computers connected through a real-time communication networks such as the Internet. In science, cloud computing is a synonym for distributed computing over a network, and means the ability to run a program or application on many connected computers at the same time.

Cloud Computing Architecture

A cloud computing system is generally divided into two sections: the front end and the back end. These sections connect to each other through a communication network such as the Internet. The user or client communicates with the system through the front end section. The back end section is the "cloud" section of the system.

The front end includes the client's machine and the application required to access the cloud computing system. Not all cloud computing systems have the same user interface. Services like Web-based e-mail programs leverage existing Web browsers like Internet Explorer or Firefox. Other systems have unique applications that provide network access to clients. On the back end of the system are the various computers, servers and data storage systems that create the "cloud" of computing services. In theory, a cloud computing system could include practically any computer program you can imagine, from data processing to video games. Usually, each application will have its own dedicated server.

In a cloud computing system, there's a significant workload shift. Local computers no longer have to do all the heavy lifting when it comes to running applications. The network of computers that make up the cloud handles them instead. Hardware and software demands on the user's side decrease. The only requirement is that the user's computer must execute the cloud computing system's interface software. This interface software can be a basic Web browser. The cloud network covers the rest of the operations.

As cloud computing has become a strategic initiative for large enterprises, the new method of delivering and consuming IT services has forced its users to rethink activities such as job scheduling. One aspect of job scheduling in cloud technology is workforce automation. Workload as use herein is an abstraction of a process or ser of processes that can be componentized, individually operated upon and produce a determinate result, with the abstraction being above the network hardware and operating system layers. A job scheduler is a tool that allows management and scheduling of jobs or workloads using a calendar system.

Workload automation is the evolution of job scheduling with advanced workload management capabilities for the dynamic data center. The aspects of scheduling workloads include automatically resolving complex dependencies on various platforms and application tiers and then triggering workloads based on both IT and business events.

A primary function of a good workload automation solution is to provide visibility into enterprise-wide workloads, regardless of where the workload or the workload automation solution is physically located. However, workloads are not operated along platform lines of separation. They have cross-platform dependences for computing needs and for application dependences. For instance, the workload automation solution could be on a mainframe but the workloads could be running on distributed platforms, or vice-versa. Most vendors have separate solutions for each platform, making it difficult for IT operations to understand workload dependencies across platforms or virtual servers.

For a dynamic workload automation solution, it becomes even more complex when workloads are run in the cloud, another virtual resource. This makes it important for the workload automation solution to be able to offer full flexibility in its ability to operate agents across platforms, virtual resource and the cloud and visibility into all of these workloads from a single place. To cite an example, CA Workload Automation solution's CA Workload Command Center displays visibility into workloads in mainframe, distributed and Amazon EC2 cloud—all in a single pane. This gives workload administrators visibility into enterprise-wide workload infrastructure.

The second aspect of cross-platform workload management, beyond visibility as discussed above is control. Workload administrators need the ability to apply job definitions that abstract out the platform differences sufficiently in order to avoid recreating multiple job definitions for each platform. This saves time, not only for adding new job definitions, but also on maintenance and service and helps IT operations be more responsive to business needs.

Users access cloud computing using networked client devices, such as desktop computers, laptops, tablets and smart phones. Cloud configurations can take the form of public clouds, private clouds or hybrid clouds. Private cloud is cloud infrastructure operated solely for a single organization, whether managed internally or by a third-party and hosted internally or externally. Undertaking a private cloud project requires a significant level and degree of engagement to virtualize the business environment, and requires the organization to reevaluate decisions about existing resources. When done right, it can improve business, but every step in the project raises security issues that must be addressed to prevent serious vulnerabilities. They have attracted criticism because users "still have to buy, build, and manage them" and thus do not benefit from less hands-on management, essentially "[lacking] the economic model that makes cloud computing such an intriguing concept".

A cloud is a "public cloud" when the services are rendered over a network that is open for public use. There is little difference between the architecture of a public and a private cloud. However, security considerations can be substantially different for services (applications, storage, and other resources) that are made available by a service provider. Generally, public cloud service providers like Amazon AWS, Microsoft and Google own and operate the infrastructure and offer access only via Internet (direct connectivity is not offered).

A hybrid cloud consists of private cloud and public cloud components. In a hybrid cloud, there has to be a determination of which component (public or private) will run a virtualized workload? For example, when assigning a virtualized server, one may want to assign it to the least expensive option, whether that be public or private. In the alternative, they may want to assign the virtual server to the private cloud until there are no more resources available, then assign virtual servers to the public cloud. In addition, a newly requested virtual server may have a higher priority for the private cloud and "bump" existing virtual servers to the public cloud http://www.globalstf.org/docs/proceedings/ccv/135.pdf discusses A Decision Support System for Moving Workloads to Public Clouds. This is different from our idea because it talks more about a decision to migrate existing bare metal applications to a virtual environment.

A central server administers the system, monitoring traffic and client demands to ensure everything runs smoothly. Most of the time, servers don't run at full capacity. That means there's unused processing power going to waste. There is a need for a method and system for migrating workloads between public clouds and between public and private clouds. Further, there is a need to consider provisioning virtual machines on demand to meet new requirements and accounts for the possibility of choosing dynamically from several different cloud environments to take advantage of the best fit.

SUMMARY OF THE INVENTION

The invention discloses a database of available cloud environments to which a virtual image workload may be deployed. The database includes information for each available cloud option, such as cost, distance, reliability, which workloads that environment may handle. A table of attributes and weights can be provided and used to create a rating of the requested deployment. This rating determines where the image is deployed. The invention discloses techniques for gathering additional information from the user about the virtual image workload to be deployed. A mapping algorithm can apply the attributes and weights to the gathered information to create a rating for the deployment. An algorithm is then used to determine to which available cloud environment the workload will be deployed. The present invention also implements a system that determines which available cloud environments have security measures such that the cloud environment is suitable to process a workload that requires determined security measures for processing. This invention can determine whether to migrate a workload to another cloud environment or process the workload at a current workload location.

DETAILED DESCRIPTION OF THE INVENTION

The present invention is a system for geographically migrating and processing workloads in a system of network cloud environments. This invention provides the ability to migrate a workload from one cloud environment to another cloud environment for more efficient processing and more efficient use of cloud environment resources.

Figure 1:
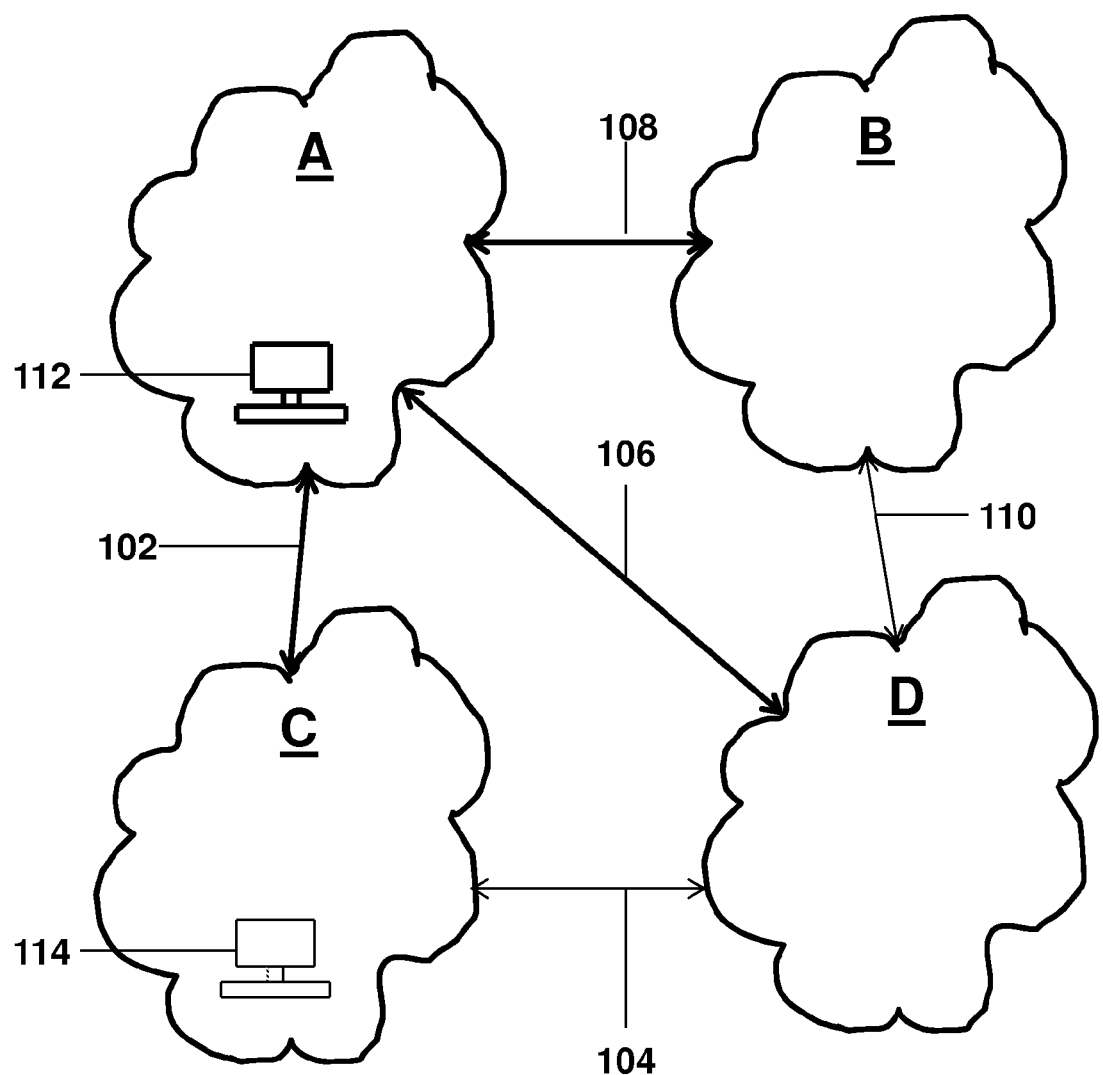
FIG. 1 is a configuration of a network cloud environments through which workloads can be migrated geographically and processed.

FIG. 1 illustrates a general configuration for a cloud network. This network comprises four different cloud environments A, B, C and D. These cloud environments are positioned in different geographic locations. Communication links 102, 104, 106, 108 and 110 provide the ability for communications between cloud environments. The cloud environments have users 112 and 114 that use these clouds to store information in the cloud database and to also use these clouds for processing purposes. The cloud users can store information in cloud databases in the respective or local clouds or store information in databases in any cloud in the network. Similarly, users can process applications and workloads in the resident cloud for their geographic location or process the applications and workloads at any cloud in the network.

Figure 2:
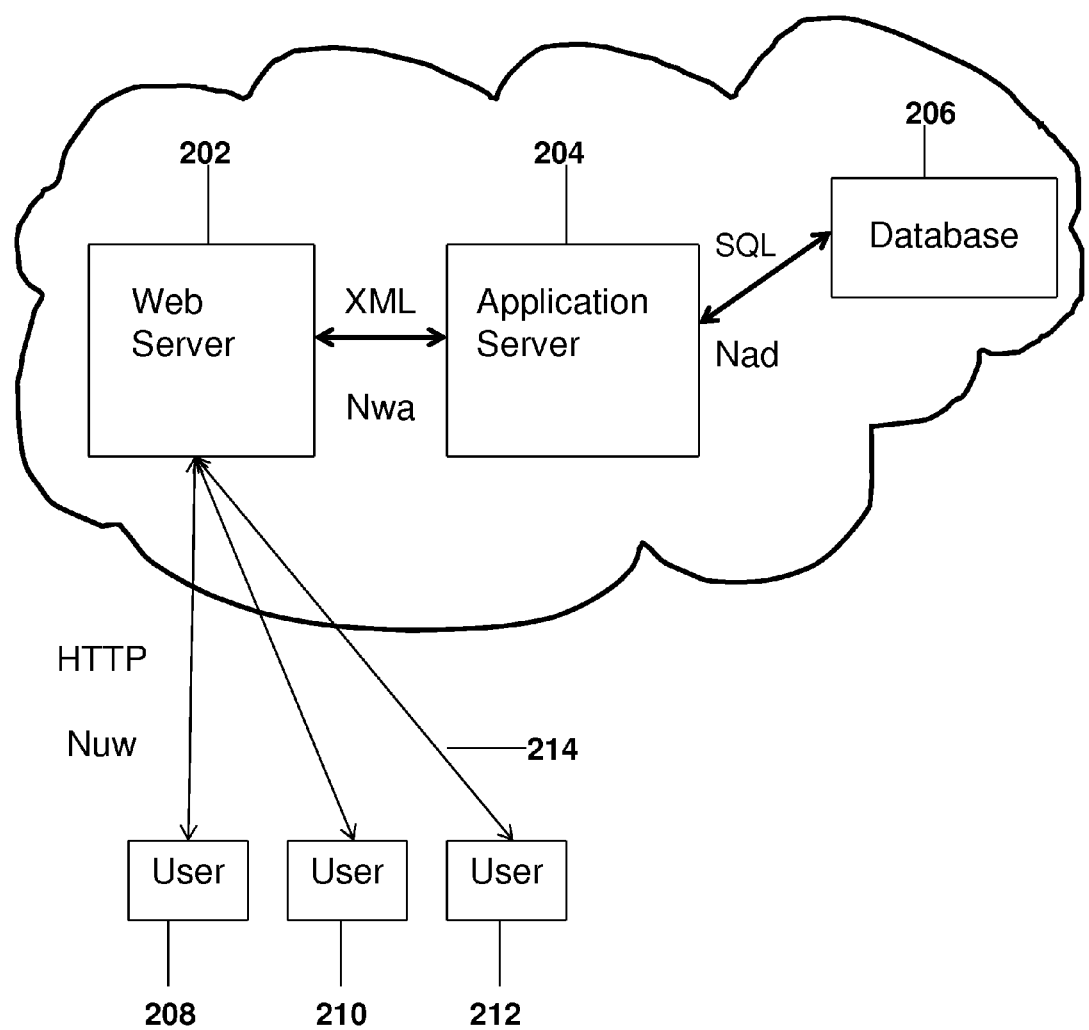
FIG. 2 is an illustration of the internal configuration of a cloud environment for processing a workload.

Even though cloud environments are used for both data storage and application and workload processing, the present invention has a particular focus on determining cloud availability for processing workloads. An objective is to improve the efficiency of workload processing in a cloud network environment. FIG. 2 illustrates the internal configuration of a cloud environment for processing a workload. A typical internal configuration for a cloud environment comprises a web server 202, an application server 204 and a cloud database 206. Users 208, 210 and 212 can communicate with the cloud environment through the web server 202 through communication links 214.

In processing applications/workloads using cloud technology, for example, customers in East Asia use applications in different hours than customers in Europe, and both groups of customers use applications in different hours than those in the Americas. Furthermore, in practice, to facilitate efficient workload processing, multiple clouds are put in multiple locations. In addition, the front end server and possibly other servers that are primarily for processing are moved rather than the cloud storage database, to the appropriate locations based on the user's location.

Referring to a cloud workload, the workload typically includes multiple virtual machines, doing different jobs. For example, in this FIG. 2 as mentioned, the cloud has three virtual machines ("VMs"): the web server 202, the application server 204, and the database 206. Very often during workload processing, the bandwidth requirements for the connection between the front end (in this case, the web server 202) and the users/clients are higher than those for the internal connections (in this case, web server to application server 204 and application server to database 206). In such cases, it would be better to place the web server closer to the majority of users.

As mentioned, the method of the present invention provides a means to access the activity in a cloud network and determine the optimal location in the cloud network for processing of a workload. This determination of the optimal location in the cloud network comprises three phases: 1) Application Instrumentation; 2) Network Test, and 3) Virtual Machine (VM) Migration.

Application Instrumentation

Application instrumentation analyzes the movement of packets between a 212, the web server 202, the application server 204 and the database 206. In the application instrumentation phase, which only needs to be done when the application or the average workload changes, the method of the present invention checks the number of packets used for the different connections. This process assesses the amount of traffic on the network. As shown in FIG. 2, the method would look for three values:

Nuw: The number of packets going between the web server and the users.
Nwa: The number of packets going between the web server and the application server.
Nad: The number of packets going between the application server and the database.

The invention also checks the size of the servers, including their disks:

Sa: The web server; Sb: The application server; Sc: The database server

Network Test

Figure 3:
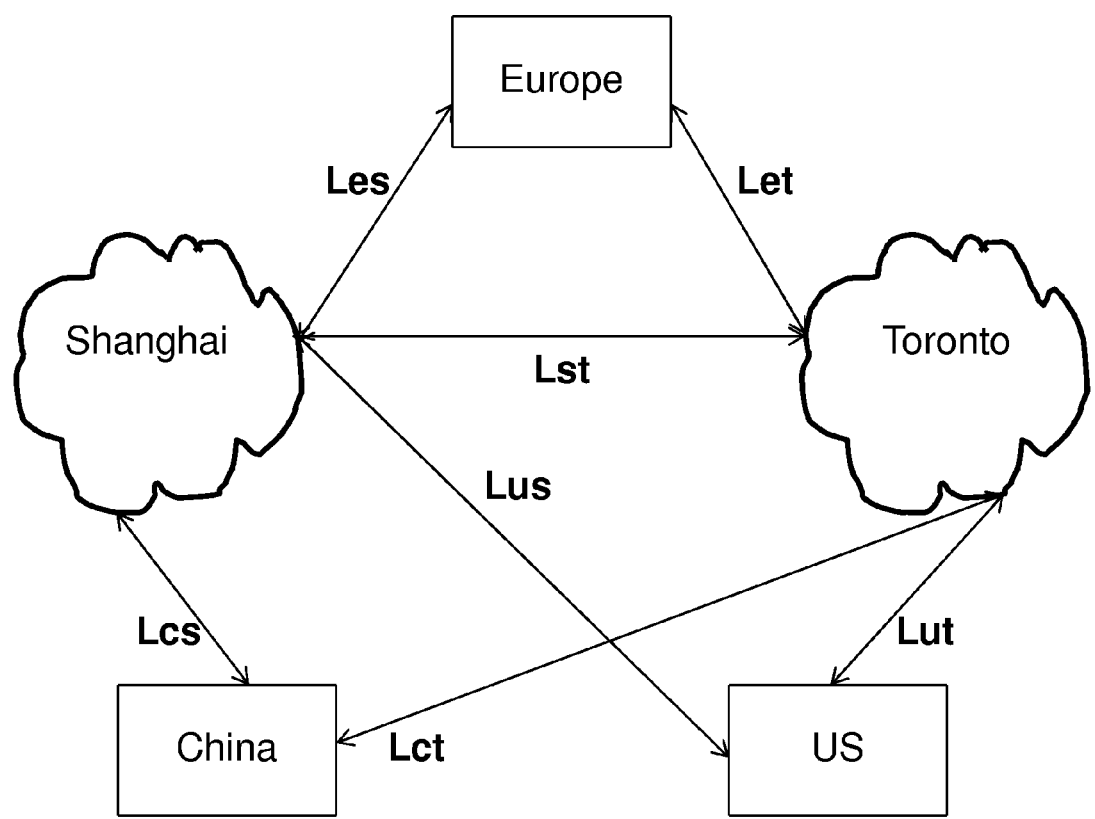
FIG. 3 is an illustration of a network of cloud environments and cloud users in various geographic locations for determining network latency from clients in various cloud locations.

The network test is the second phase in determining of the optimal location in the cloud. Referring to FIG. 3, shown is an illustration of a network of cloud environments and cloud users in various geographic locations for determining network latency from clients in various cloud locations. This network test phase determines the latency in the network. The latency is basically the time required for a packet to move from an initial network component to a second network component and then back to the original network component. Every hour or so, use a service that has clients in multiple places, such as geoedge.com, to get the latency from client locations to various clouds. For discussing latency, the parameters are identified as follows:

LDT—Direct latency Toronto
LDS—Direct latency Shanghai
LDU—Direct latency United States
  Nc—Number of uses in China
  Ne—Number of uses in Europe
  Nu—Number of uses in United States
Lcs—latency between China and Shanghai
Lct—latency between China and Toronto
Lut—latency between United States and Toronto
Lus—latency between United States and Shanghai
Let—latency between Europe and Toronto
Les—latency between Europe and Shanghai
Lst—latency between Shanghai and Toronto Referring to FIG. 3, using these values, it is possible to approximate the total latency. If China currently has Nc users, Europe Ne users and the United States Nu users, then the direct latency would be $LDs=Nc*Lcs+Ne*Les+Nu*Lus$ if the front end server were in Shanghai, and $LDt=Nc*Lct+Ne*Let+Nu*Lut$.

If the database VM has to stay in Toronto (it has a huge disk so it would be too big to move), there are three possible configurations:

1. Everything is in Toronto. In that case, $L1=LDt=Nc*Lct+Ne*Let+Nu*Lut$.
2. Only the web server is in Shanghai. In that case, $L2=LDs+Lst*(Nc+Ne+Nu)*(Nwa/Nuw)$.
3. Web server and application server in Shanghai. In that case, $L3=LDs+Lst*(Nc+Ne+Nu)*(Nad/Nuw)$.

Virtual Machine (VM) Migration

In this phase, there is a determination of whether to move or migrate data or a workload to a location other than the original location. To make this discussion, there has to be determination of how much latency justifies moving an amount of data between Toronto and Shanghai. This factor will be referred to as factor q. Calculate the minimum of {L1, L2, L3}. If that minimum is different from the current state by more than qSa (if switching between 1 and 2), qSb (if switching between 2 and 3), or q(Sa+Sb) (if switching between 1 and 3), switch the virtual machine from one cloud to the other.

Figure 4:
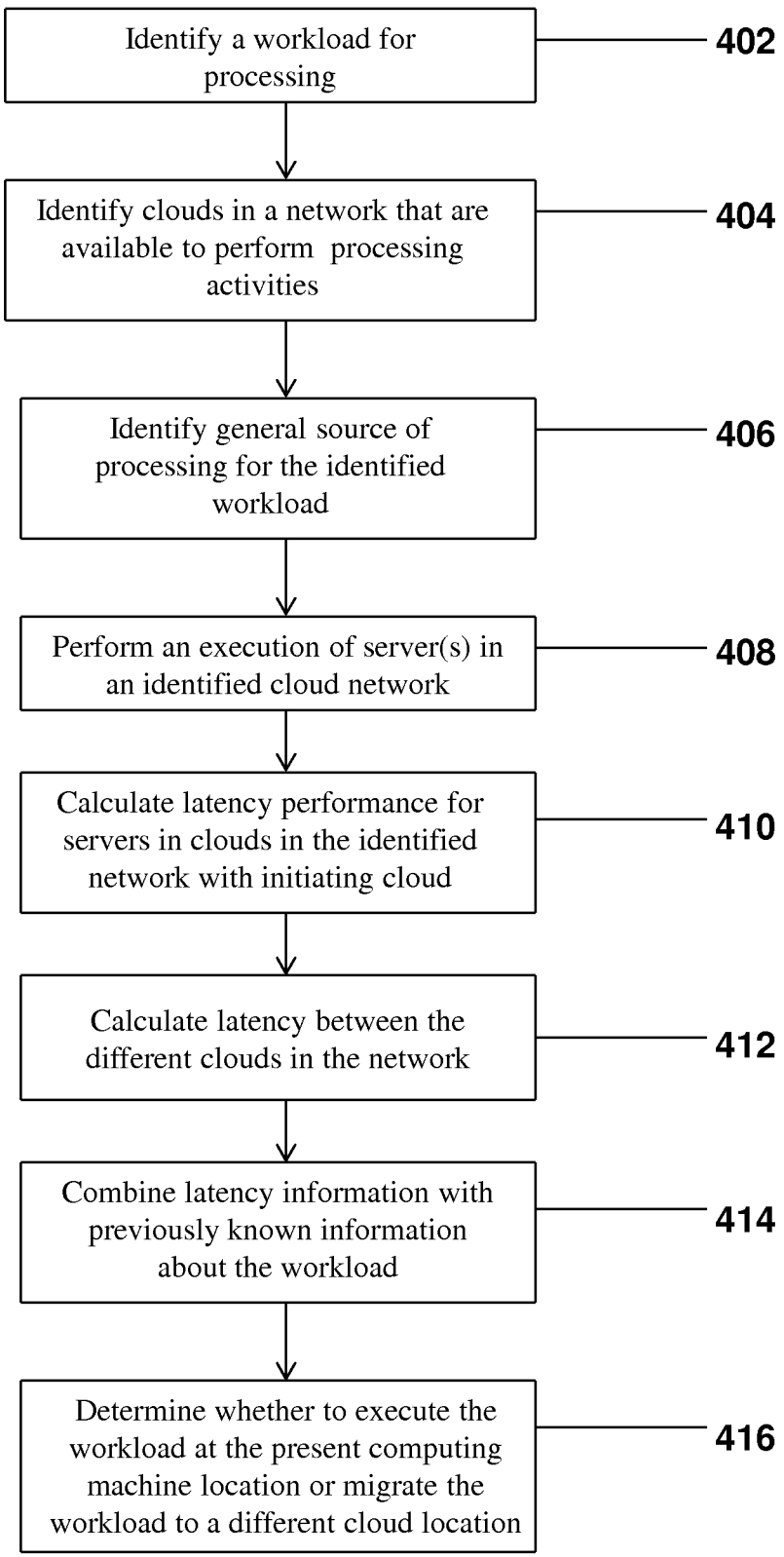
FIG. 4 is a flow diagram of the steps in a general implementation of the method of the present invention for determining cloud environment availability.

The method for determining the availability of a cloud environment for purposes of workload migration is illustrated in FIG. 4. In this method an initial step 402 is to identify a workload for possible migration to an available cloud environment for processing. This identification of a workload for processing at an available cloud environment can involve the use of various established parameters such as size of the workload and current location of the workload. The next step 404 is to identify cloud environments in a cloud network that are available to perform workload processing activities. This step 404 can involve establishment of a database of clouds and a rating system that characterizes the availability of each cloud environment. Step 406 identifies a general processing source for the specific workload for which processing is desired. This step identifies the current processing source for the workload. For example, if the client with the workload to be processed is in the United States, this step 406 identifies the processing source in the United States (generally, the first option) for processing the workload. Step 408 begins the assessment of the servers in an identified cloud network. In addition to the initial processing source identified in step 406, step 408 identifies other servers in the cloud network that could be potential servers for processing the workload.

As previously discussed, in assessing servers in a cloud network to determine cloud availability for processing workloads, it is desirable to perform latency calculations of the servers in the cloud network. Step 410 calculates latency performance for servers in cloud environments in the cloud network with the initiating cloud. A cloud environment can have multiple servers that are capable of workload processing. In this step 410, the latency (time required to send a packet and have that packet returned) between servers in a particular cloud are calculated. Step 412 determines the latency between the clouds in different networks. Referring back to FIG. 3, step 410 can determine the latency of the Toronto cloud and a U.S. client. Step 412 can determine the latency between the Toronto cloud and the Shanghai cloud or the latency between a U.S. client and the Shanghai cloud. Step 414 gathers and combines the latency information calculated in steps 410 and 412. This step also combines the latency information with previously known and identified information about the particular workload identified for processing. Step 416 then determines whether to process the workload at the present computing machine and location identified in step 406 or to migrate the workload to a different cloud location.

As mentioned, workloads can be migrated between cloud environments to facilitate more efficient use of processing resources. When there is a high volume of processing in one cloud location, workloads from that high volume cloud can be migrated to clouds that have much lower volumes at that same time. FIG. 4 describes the process of identifying available cloud for processing workloads. This availability is based mainly on capacity to accommodate the processing of additional workloads. However, workload migrate can involve other factors such as machine security. In hybrid cloud systems, there can be public clouds and private clouds. Private clouds are typically more secure and not as accessible. In addition, some workloads also have security requirements and there may be a desire to have these workloads processed on machines that have more stringent security mechanisms.

Figure 5:
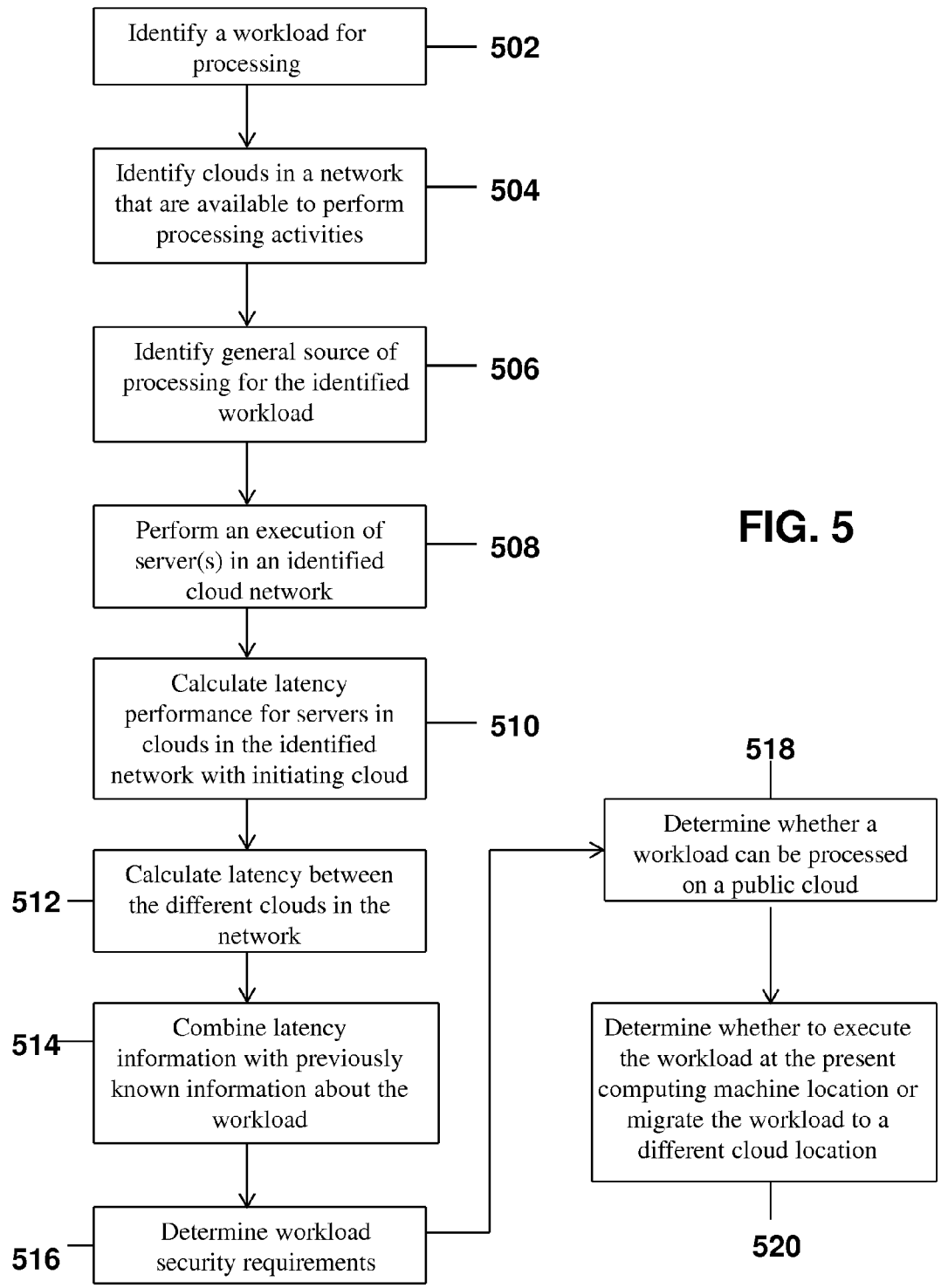
FIG. 5 is a flow diagram of the steps in a general implementation of the method of the present invention for determining cloud environment availability and cloud security for processing an identified workload.

FIG. 5 describes an implementation of the method of the present invention for determining cloud environment availability and cloud security for processing an identified workload. In FIG. 5, the steps 502, 504, 506, 508, 510 and 512 are the same as steps 402, 404, 406, 408, 410 and 412 of FIG. 4 respectively. Step 514 gathers and combines the latency information calculated in steps 510 and 512. This step also combines the latency information with previously known and identified information about the particular workload identified for processing. At this point, step 516 identifies and determines security requirements for an identified workload. Step 518 determines whether a workload could be processed on a public cloud. Typically, the private cloud would have sufficient security to satisfy processing requirements for any workload. Step 520 determines whether to execute the specific workload at the present computing machine location or to move or migrate the workload to a different cloud location for processing.

Figure 6:
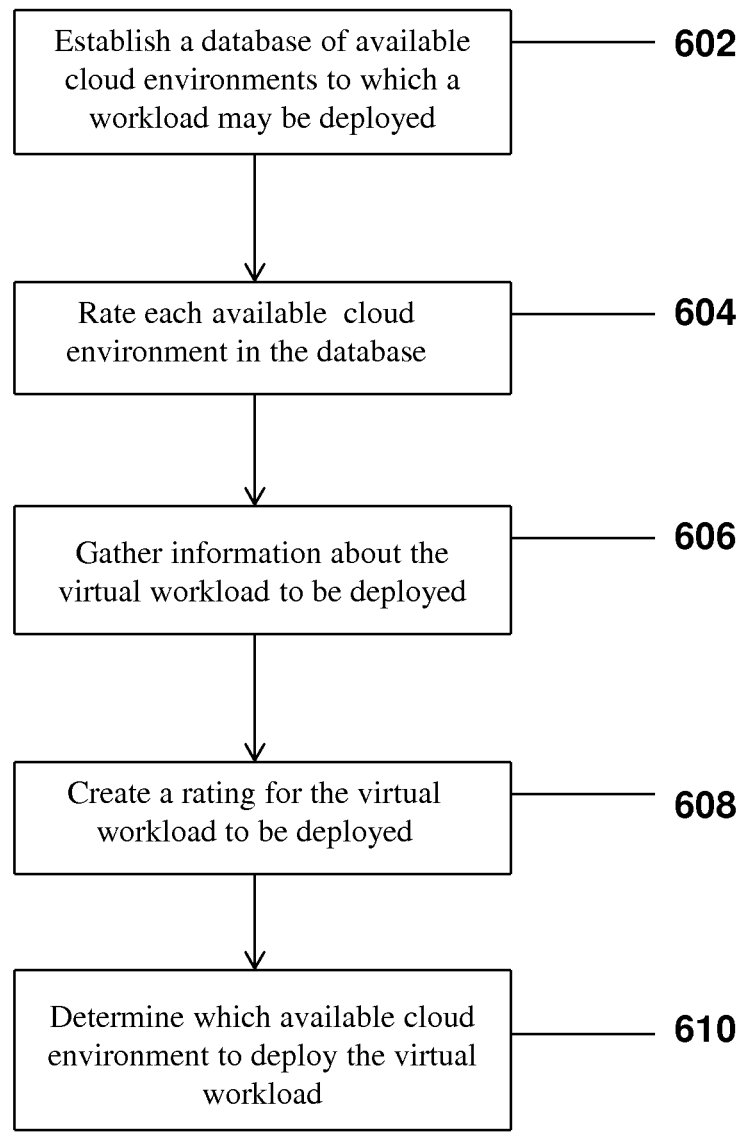
FIG. 6 is a flow diagram of the steps in determining which cloud environment to migrate a workload.

FIG. 6 provides more details about the process of identifying which specific cloud to migrate a workload for processing. As part of identifying an appropriate cloud environment for processing a workload step 602 establishes a database of available cloud environments to which a workload may be deployed. The database could be comprised based on a capacity requirement such as clouds that have fifty percent (50%) available capacity at any one time can be included in the database.

A rating system can be created, and each master image from which a virtualized workload is cloned is rated according to this system. The rating mechanism has a series of attributes, each with its own weight. The various master images are rated on these attributes. Additionally, the requestor of the virtualized workload can enter information to influence the rating of the system. Step 604 rates each available cloud in the database. The database rating system includes ratings for each available cloud option can be based on parameters such as cost, distance, reliability, which workloads that environment may handle. The rating system can generate a table of attributes and weights. This table is used to create a rating of the requested deployment. This rating will determine where the image is deployed. Step 606 gathers specific information about the workload for which processing is desired. This information about the workload can include the size of the workload. Step 608 creates a rating for the workload to be processed. This step incorporates information from steps 604 and 606 to create the rating. A mapping algorithm can be used to create this rating. The mapping algorithm applies attributes and weights to the input about the workload to create a rating for the workload deployment. As previously mentioned, another parameter could be security of the processing for the work. Based on the rating created in step 608 for a workload, step 610 determines which available cloud from the cloud database to deploy the workload for processing. In this step 610, an algorithm to determining to which available cloud environment the workload will be deployed.

It is important to note that while the present invention has been described in the context of a fully functioning data processing system, those skilled in the art will appreciate that the processes of the present invention are capable of being distributed in the form of instructions in a computer readable storage medium and a variety of other forms, regardless of the particular type of medium used to carry out the distribution. Examples of computer readable storage media include media such as EPROM, ROM, tape, paper, floppy disc, hard disk drive, RAM, and CD-ROMs.

We claim:

1. A method for geographic migration of workloads for processing between available cloud environments comprising:
   identifying a workload for processing that utilizes a first virtual machine executing on a first cloud environment and a second virtual machine executing on a second cloud environment, wherein the first virtual machine passes data between a set of clients and the second virtual machine;
   calculating a first latency performance between the first virtual machine and the set of clients;
   calculating a second latency performance between the first virtual machine and the second virtual machine;
   analyzing the first latency performance against the second latency performance; and
   migrating the first virtual machine to a third cloud environment based on the analyzing, wherein the third cloud environment is closer in geographic proximity to the set of clients relative to the geographical proximity of the first cloud environment to the set of clients.

2. The method as described in claim 1 further comprising creating a database of available cloud environments to which a virtual image workload may be deployed, the available cloud environments in the database being rated according to a set of parameters that can include cost, distance, reliability, which workloads that environment may handle, the database also identifying whether a cloud environment is public or private and determining which component (public or private) will run a virtualized workload.

3. The method as described in claim 1 wherein said identifying a machine in a cloud environment for processing a workload further comprises:
   creating a table of attributes of the workload;
   creating a rating of the workload to be processed; and
   determining a processing location for the identified workload based on the created rating for the workload.

4. The method as described in claim 1 wherein said identifying a workload for processing further comprises gathering additional information about the workload to be deployed.

5. The method as described in claim 3 wherein said determining a processing location for the identified workload based on the created rating for the workload further comprises creating a mapping algorithm which applies the table of attributes and a set of weights to an input from information gathered from the workload to create a rating for placement of the workload for processing.

6. The method as described in claim 5 further comprising creating an algorithm to identify one of the available cloud environments to deploy the workload.

7. A system for determining geographic migration of workloads for processing between available cloud environments comprising:
   a cloud database containing information for each available cloud option, including cost, distance, reliability, which workloads that environment may handle;
   a web server for facilitating communications from a set of clients utilized by a set of cloud users, wherein the web server executes at a first geographic location;
   an application server for processing and transmitting data packets from and to the web server;
   a movement analyzer that analyzes movement of packets between the set of clients, the web server, the application server and the cloud database;
   a network tester that determines the optimal location in the cloud for processing a workload, wherein the network tester calculates a first latency performance between the web server and the set of clients, and calculates a second latency performance between the web server and the application server; and
   a virtual migration machine that makes a determination of whether to migrate the web server to a second geographic location based on analyzing the first latency performance against the second latency performance.

8. The system for determining geographic migration of workloads for processing between available cloud environments as described in claim 7 wherein said virtual migration module has the capability to:
   identify one or more cloud environments in a cloud network that are available to process the workload;
   assess activity of the identified one or more cloud environments;
   identify a virtual machine in one of the one or more cloud environment to process the workload based on the activity assessment; and
   process the workload at the identified virtual machine.

9. The system of claim 7 for determining geographic migration of workloads for processing between the available cloud environments as described in claim 7 wherein said virtual migration module further comprises a mapping algorithm which applies a set of attributes and a set of weights to an input from information gathered from the workload to create a rating for placement of the workload for processing.

10. The system of claim 7 for determining geographic migration of workloads for processing between the available cloud environments as described in claim 7 wherein said virtual migration module further comprises an algorithm to identify one of the available cloud environments to deploy the workload.

* * * * *